United States Patent [19]

Nakamura et al.

[11] Patent Number: 5,119,287
[45] Date of Patent: Jun. 2, 1992

[54] OPTIMUM TRACKING CONTROL METHOD FOR PERIODIC TARGET VALUE

[75] Inventors: Hiroshi Nakamura; Shigeru Futami, both of Kitakyushu, Japan

[73] Assignee: Kabushiki Kaisha Yaskawa Denki Seisakusho, Fukuoka, Japan

[21] Appl. No.: 363,906

[22] PCT Filed: Sep. 6, 1988

[86] PCT No.: PCT/JP88/00897
§ 371 Date: Apr. 28, 1989
§ 102(e) Date: Apr. 28, 1989

[87] PCT Pub. No.: WO89/02617
PCT Pub. Date: Mar. 23, 1989

[30] Foreign Application Priority Data

Sep. 11, 1987 [JP] Japan .................. 62-229233
Mar. 17, 1988 [JP] Japan .................. 63-65273

[51] Int. Cl.$^5$ .................. G05B 13/02; G06F 15/46
[52] U.S. Cl. .................. 364/148; 364/165; 364/178; 364/183
[58] Field of Search .......... 364/148, 164, 165, 178, 364/179, 194, 149-152, 183; 318/561

[56] References Cited

U.S. PATENT DOCUMENTS 4,358,822  11/1982  Sanchez .................. 364/178 X
4,769,583  9/1988  Goor .................. 364/172 X
4,853,839  8/1989  Nicholas et al. .................. 364/167.01

Primary Examiner—Joseph Ruggiero
Attorney, Agent, or Firm—Jordan and Hamburg

[57] ABSTRACT

A conventional design method intended for repetitive target values utilizes a tracking error of one period before or such a error at the time t' at the preceding trial corresponding to the present time t. The error from the time of one period before up to the present or what is the time t' after has not been utilized, though it is very useful when the present invention uses an algorithm for making the output of a controlled system follow up a periodic target value in an optimum determined manner with only four fundamental arithmetic operations, using an incremental amount of modification at individual sampling time, tracking errors of one period before and thereafter, the present tracking error, the past incremental amounts of modification, the control input of one period before and preset constants. The control method according to the present invention is characterized by minimizes the weighting square sum of estimated values of a future tracking error, using a control input at individual sampling time, tracking errors of one period before and thereafter, the amounts of past modification, data (indicial response) pertaining to the dynamic characteristics of a controlled object, and the control input of one period before or its equivalent for the controlled object having target a value repeating the same pattern.

26 Claims, 14 Drawing Sheets

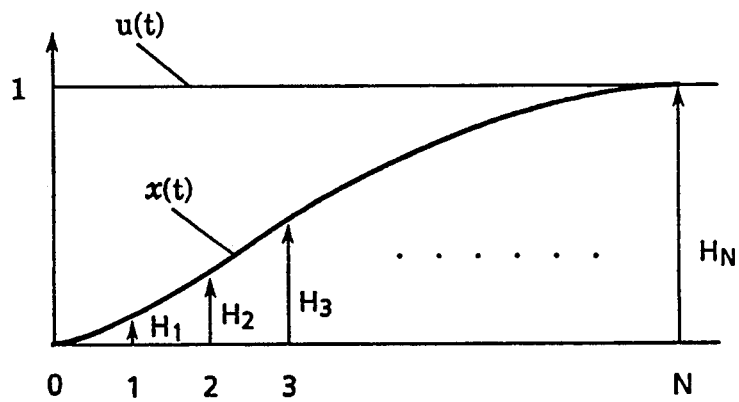
FIG. 5
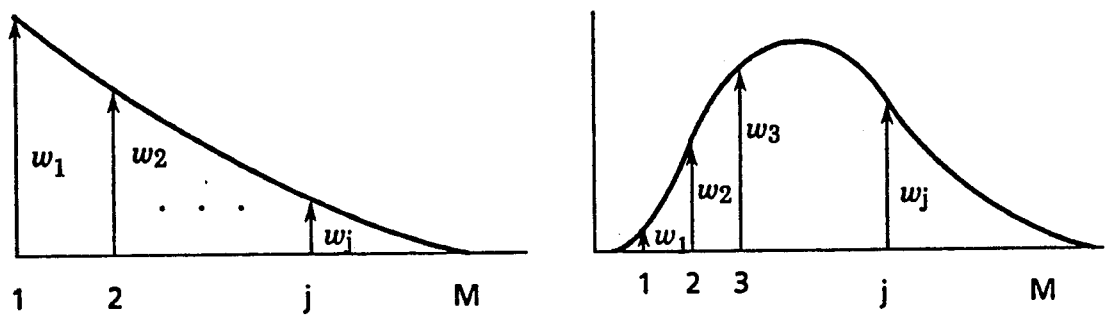
FIG. 6A
FIG. 6B
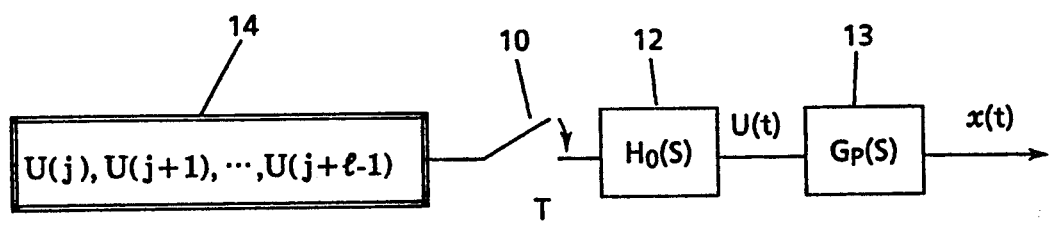
FIG. 7

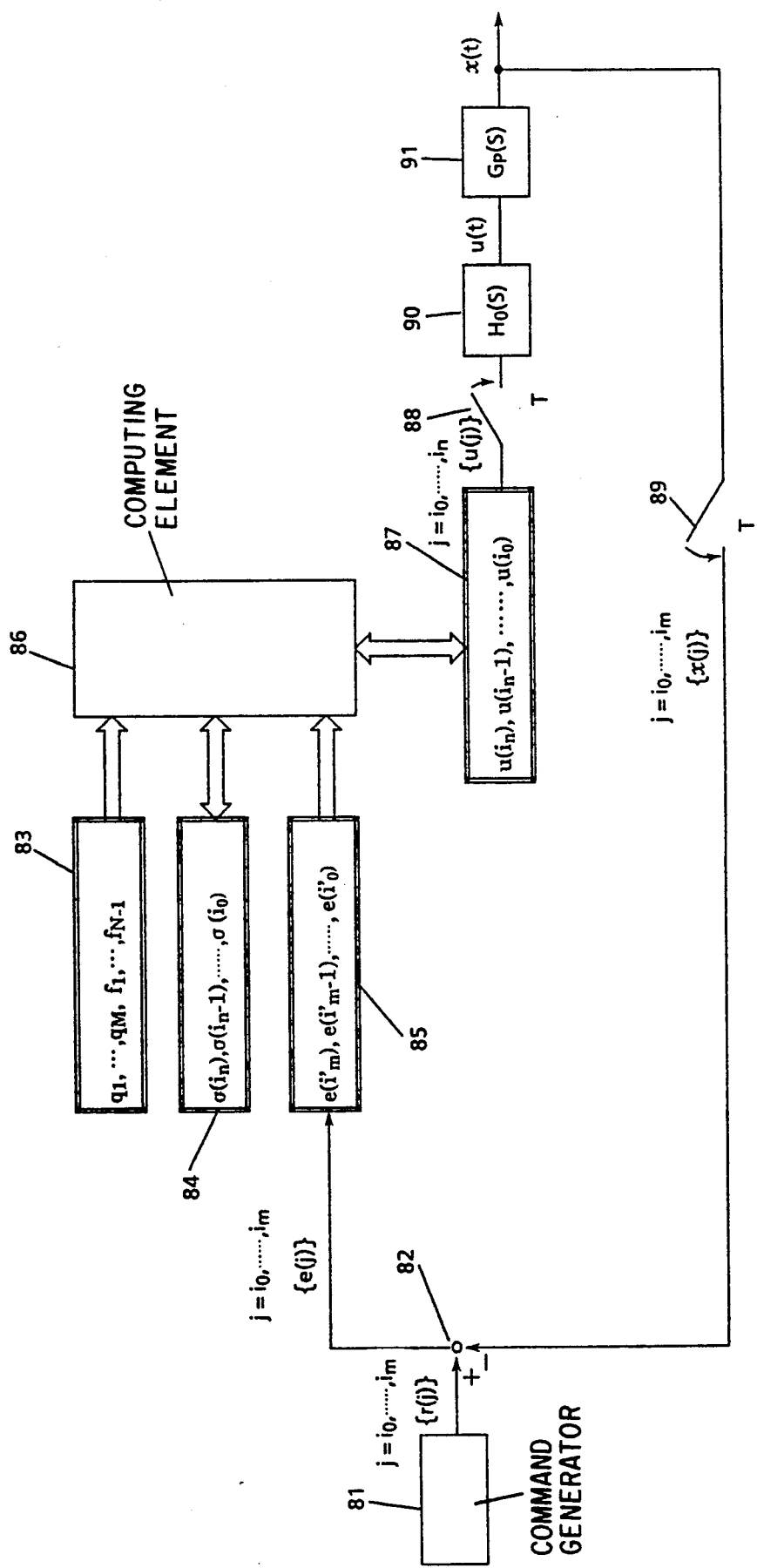
F I G. 23

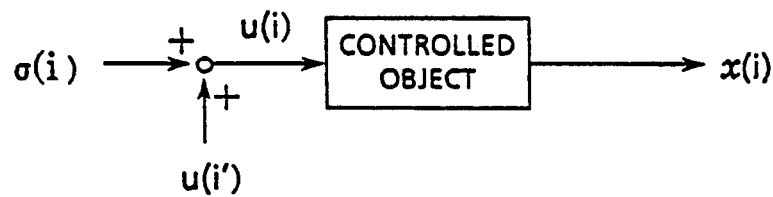
F I G. 24
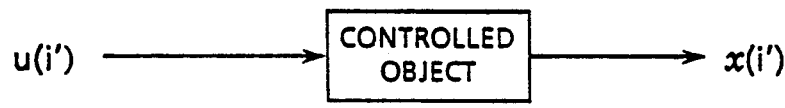
F I G. 25
F I G. 26
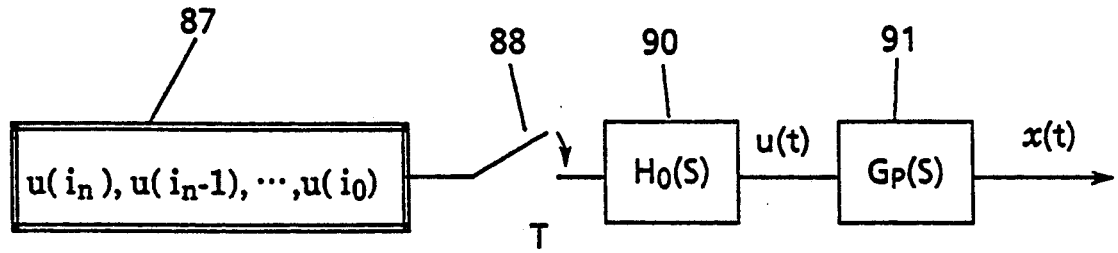
F I G. 27 preceding trial　　　　　　present trial

OPTIMUM TRACKING CONTROL METHOD FOR PERIODIC TARGET VALUE

FIELD OF ART

The present invention relates to a method for controlling a robot and the like by means of an optimum tracking technique using desired future values in combination with a repetitive control technique.

BACKGROUND OF THE INVENTION

Studies are being conducted on methods of designing control systems for controlling repetitive target values under which a tracking error of one period before is utilized (e.g., "Precision Control over the Repetitive Operation of Power Supply for Proton Synchrotron Electromagnet" by Inoue et al, Complied Papers of the Japan Electric Society, Vol. 100. No. 7, etc.). FIG. 28 illustrates the basic concept of such a method, wherein r, e, u and x represent a target value, a tracking error, a control input and a control output, respectively. L designates a period of the target value (see FIG. 29A, whereas $e^{-Ls}$ is a dead time element which causes a delay by time L. The control input u(t) at time t is given by $$u(t) = u(t-L) + e(t-L)$$

and what is featured in this is a control input of one period before and a tracking error of one period before are utilized; advantages claimed therefor include the possibility of not only high precision follow-up but also removal of periodic disturbance.

This method is also applicable to a case where the target value repeats a similar pattern intermittently (see FIG. 29B) and the control input u(t) at time t then becomes $$u(t) = u(t') + e(t')$$

where t' represents the time at the preceding trial corresponding to the time t.

There is also a method of the sort disclosed in the present inventor's patent application laid open by Japanese Patent Publication No. 118405/1987 as a predicted control method for minimizing the weighting square sum of the estimated values of a furture tracking error.

In this method, a control input u(i) at present sampling time i is given as follows $$u(i) = \sum_{j=-\infty}^{i} m(j)$$

using an incremental control input. In this case, a future tracking error consisting of a sampling value of the indicial response of a controlled object, the before incremental control input, the present output and a future target value is estimated and an incremental control input m(i) is determined so that the weighting square sum of the estimated values is minimized.

Since a future target value is utilized in this method, the response characteristics obtained are superior to those obtained from a control system using only the present target value. Further, the advantage is simply that the four fundamental arithmetic operations are needed to implement the method.

Moreover, Japanese Patent Application Laid-Open No. 118406/1987 discloses a proposal of a predicted control method utilizing a tracking error of one trial before, the method being characterized in that a target value repeating the same pattern is provided with a combination of the aforesaid incremental control input and the constant number of times the tracking error of one trial before as a new incremental control input.

However, the above-described design method for the repetitive target value, i.e., the repetitive control method and what is disclosed in Japanese Patent Application Laid-Open No. 118406/1987 both utilize the tracking error at the time of one period before or the tracking error at time t' corresponding to the present time t at the time of the preceding trial (see FIG. 29B. Despite the fact that a tracking error during the period from the time of one period before up to the present or a tracking error after the time t' is extremely useful when the control input at this time is determined, such a tracking error has not been utilized in those methods.

DISCLOSURE OF THE INVENTION

In order to solve the problems inherent in the conventional methods, a first embodiment is characterized in that:
(1) tracking errors of one period before and thereafter;
(2) the present tracking error;
(3) N−1 past incremental modifications;
(4) the control input of one period before; and
(5) a predetermined constant
are used to obtain the algorithm for determining the incremental amount of modification on a sampling time basis so that the output of the controlled object is made to follow up a periodic target value in the most favorable manner only through four fundamental arithmetic operations.

A second embodiment is characterized in that:
(1) tracking errors during one period in the past and the present error;
(2) the incremental amount of past modification;
(3) data pertaining to the dynamic characteristics of a controlled object (indicial response); and
(4) a control input at the time of one period before
are used to determine a control input at each sampling time for a controlled object having a target value repeating the same pattern with a constant period so that the weighting square sum of the estimated values of a future tracking error is minimized.

A third embodiment is characterized in that:
(1) a tracking error during past one period;
(2) the amount of past modification;
(3) data pertaining to the dynamic characteristics of a controlled object (indicial response); and
(4) a control input at the time of one period before
are used to determine a control input at each sampling time for a controlled object having a target value repeating the same pattern with a constant period so that the weighting square sum of the estimated values of a future tracking error is minimized.

A fourth embodiment is characterized in that:
(1) tracking errors at present and the preceding trial;
(2) the incremental amount of past modification;
(3) data pertaining to the dynamic characteristics of a controlled object; and
(4) a control input at the preceding trial
are used to determine a control input at each sampling time for a controlled object having a target value intermittently repeating the same pattern so that the weighting square sum of the estimated values of a future tracking error is minimized.

A fifth invention is characterized in that:
(1) a tracking error at the preceding trial;
(2) a control input at the preceding trial;
(3) data pertaining to the dynamic characteristics of a controlled object; and
(4) the amount of modification at the preceding trial are used to determine a control input at each sampling time for a controlled object having a target value intermittently repeating the same pattern so that the weighting square sum of the estimated values of a future tracking error is minimized.

BRIEF DESCRIPTION OF DRAWINGS

FIG. 5 is a graph illustrating the indicial response of the controlled object.

FIG. 6(a) is a chart illustrating an example of the index function of coefficient relative to time.

FIG. 6(b) is a chart illustrating an example of the impulse response of a weighted coefficient relative to time.

FIG. 7 is a block diagram illustrating an arrangement when data stored in a memory is used as a control input.

FIG. 23 is a block diagram illustrating a configuration of an embodiment of a fifth invention of the present application.

FIGS. 24 to 26 are block diagrams illustrating the input/output relations of a controlled object.

FIG. 27 is a block diagram illustrating an arrangement when data stored in a memory is used as a control input after a trial has been carried out sufficiently.

DESCRIPTION OF THE PREFERRED EMBODIMENT

Referring to the accompanying drawings, embodiments the present invention will subsequently be described in detail.

Figure 1:
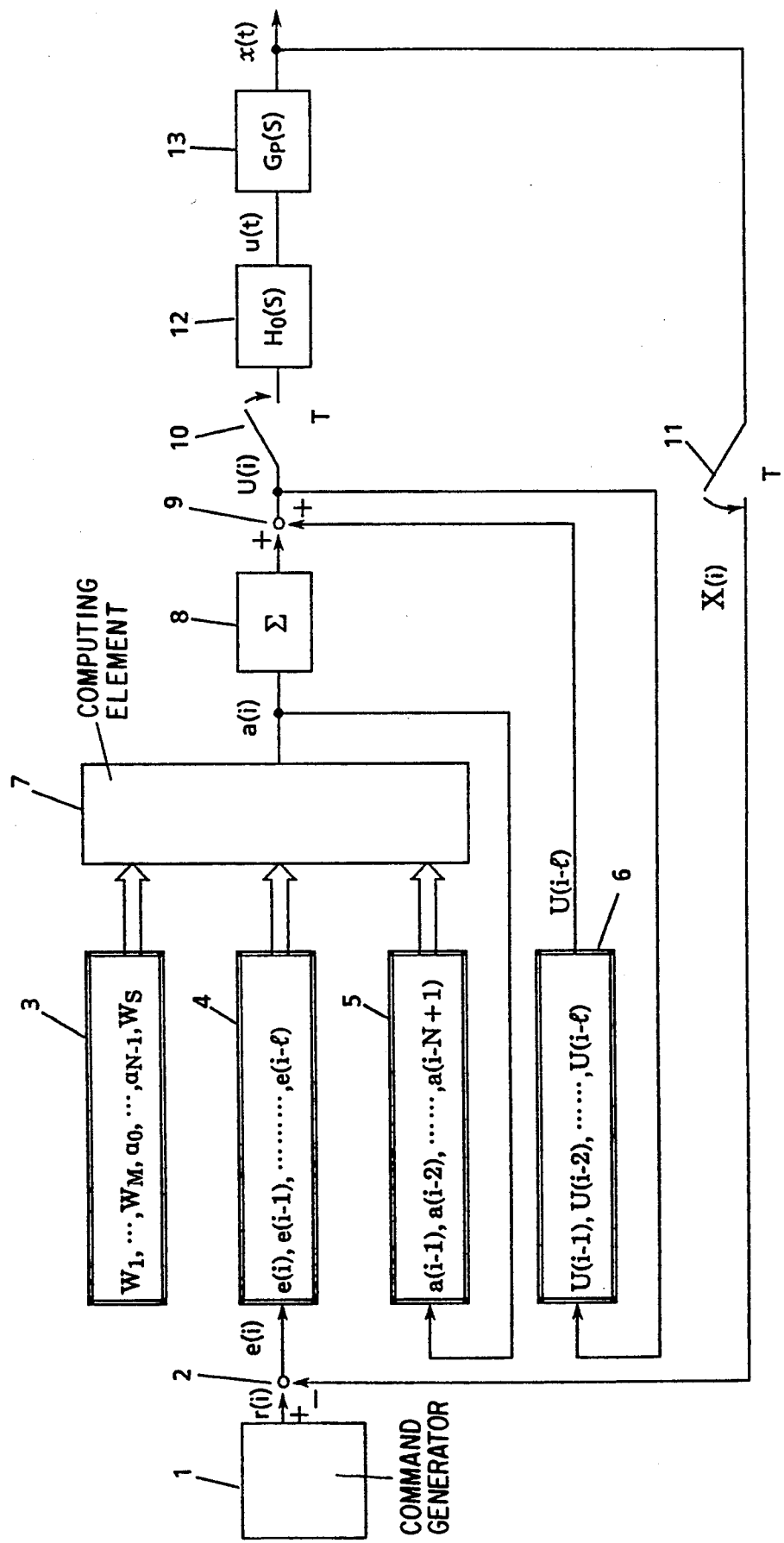
FIG. 1 is a block diagram illustrating a configuration of an embodiment of a first invention of the present application.

FIG. 1 shows a specific embodiment of a first embodiment of the present application. In FIG. 1, there is shown an arrangement including a command generator 1 having a period l and generating a target value r(i) at the present time i; a subtracter 2 used to seek and store a tracking error e(i); a memory 3 for storing constants $W_1, W_2, \ldots, W_M, W_s, a_o, a_1, \ldots, a_{N-1}$; a memory 4 for storing tracking errors e(j) (j=i, i−1, ..., i−l) of the past period l. At the present time i, a tracking error e(i) for this time is substituted for the old value and stored.

The arrangement further includes a memory 5 for storing the incremental amount of modification a(j) (j=i−1, i−2, ..., i−N+1) from time prior by one sampling to the present time up to the time of N−1 before, and a memory 6 for storing the control input U(j) (j=i−1, i−2 ..., i−l) from the preceding time up to the time of one period before.

The incremental amount of modification a(i) and control input U(i) this time are substituted for the old values and stored in the memories 5, 6 at the time they are computed this time.

The arrangement still further includes a computing element 7 for calculating the incremental amount of modification this time by carrying out the operation of $$a(i) = \left\{ \sum_{k=1}^{M} W_k e(i + k - l) - W_s(e(i - l) - e(i)) - \sum_{n=1}^{N-1} a_n a(i - n) \right\} / a_0 \quad (1)$$

an accumulator 8 for computing the amount of modification $$\sum_{j=-\infty}^{i} a(j);$$

an adder 9 for adding the control input U(i−1) at the time of one period before and the amount of modification this time $$\sum_{j=-\infty}^{i} a(j)$$

together and outputting the control input U(i) this time, U(i) being assumed U(i)=0, a(i)=0 when the control starts; samplers 10, 11 which close with a sampling period of T; a holding circuit 12; a controlled object 13 with an input u(t) and the an output x(t); and control systems 2-12 normally called controllers simply formed with digital circuits for general use or microcomputers.

Eq. (1) is is proved hereinafter.

Figure 2:
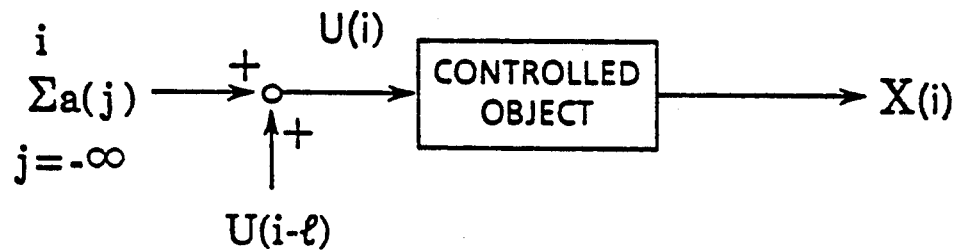
FIGS. 2 to 4 are block diagrams illustrating the input/output relations of a controlled object.
Figure 3:
Figure 4:
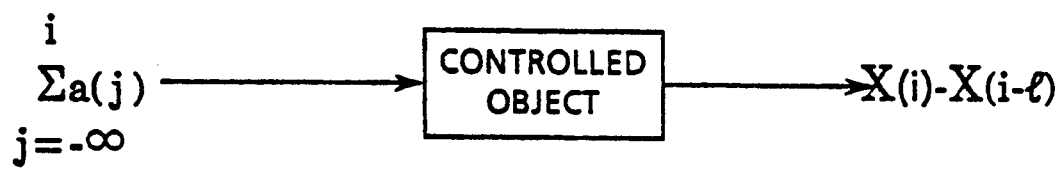

From FIG. 1, the input/output relation of the controlled object becomes as shown in FIG. 2. Here, the samplers 10, 11 and the holding circuit 12 are assumed to be included in the controlled object. In addition, the relation of FIG. 4 is obtained from FIGS. 2, 3 because the relation of FIG. 3 is established at the time i−1 of one period before.

When an output at the present time i is defined as $\epsilon(i)$, i.e., $$\epsilon(i) \triangleq X(i) - X(i-1) \tag{2}$$

the estimated value $\hat{e}(i+k)$ (k=1,2,...) of the output on and after the i+1 is given by the following equation:

$$\hat{e}(i + k) = \epsilon(i) + a(i)H_k + \sum_{n=1}^{N-1} a(i - n)(H_{n+k} - H_n) \tag{3}$$

where $H_j$ (j=1,2,...,N) is a sample value at the sampling interval of the indicial response of the controlled object. Accordingly, N is selected so as to set the response satisfactory (FIG. 5).

Further, $H_{N'} = H_N(N' > N)$

The estimated value $\hat{X}(i+k)$ of the output at the point of time i+k is given by $$\hat{X}(i+k) = \hat{e}(i+k) + X(i-l+k) \tag{4}$$

from Eq. (2) and therefore the estimated value $\hat{e}(i+k)$ of the tracking error becomes $$\hat{e}(i+k) = r(i+k) - \hat{X}(i+k) = r(i+k) - X(i-l+k) - \hat{e}(i+k) \tag{5}$$

Since $r(i+k-l) = r(i+k)$, ultimately $$\hat{e}(i+k) = e(i-l+k) - \hat{e}(i+k) \tag{6}$$

With the square sum J(a(i)) of the estimated values of the tracking error up to time i+M weighted in terms of time $$J(a(i)) = \sum_{k=1}^{M} w_k \hat{e}^2(i+k) \tag{7}$$

as a cost function, the incremental amount of modification a(i) is selected so that J(a(i)) is minimized. In this case, $w_k$ is a weighting coefficient relative to time and examples of the coefficient are shown in FIGS. 6A, 6B, wherein an index function is shown in FIG. 6A, whereas sample values at the sampling interval T of the impulse response of the controlled object are shown in 6B.

Then a(i) which minimizes J(a(i)) is given by $$dJ(a(i))/da(i) = 0 \tag{8}$$

and from Eqs. (7), (6), (3), $$dJ(a(i))/da(i) = d\left\{\sum_{k=1}^{M} w_k \hat{e}^2(i+k)\right\}/da(i) \tag{9}$$

$$= d\left\{\sum_{k=1}^{M} w_k(e(i-l+k) - \hat{e}(i+k))^2\right\}/da(i)$$

$$= -2\sum_{k=1}^{M} w_k H_k \bigg( e(i-l+k) - \epsilon(i) - a(i)H_k -$$

$$\sum_{n=1}^{N-1} (i-n)(H_{n+k} - H_n) \bigg\}$$

From Eqs. (8), (9), therefore, $$\left(\sum_{k=1}^{M} w_k H_k^2\right) a(i) = \sum_{k=1}^{M} w_k H_k \bigg( e(i-l+k) -$$

$$\epsilon(i) - \sum_{n=1}^{N-1} a(i-n)(H_{n+k} - H_n) \bigg\}$$

From Eq. (2), $\epsilon(i)$ can be rewritten to $$\begin{aligned}
\epsilon(i) &= X(i) - X(i-l) \\
&= \{r(i-l) - X(i-l)\} - \{r(i) - X(i)\} \\
&= e(i-l) - e(i)
\end{aligned} \tag{11}$$

Accordingly, a(i) which minimizes J(a(I)) is obtained from Eqs. (10), (11) as follows:

$$a(i) = \bigg\{ \sum_{k=1}^{M} W_k e(i-l+k) -$$

$$W_s(e(i-l) - e(i)) - \sum_{n=1}^{N-1} a_n a(i-n) \bigg\}/\alpha_0 \tag{12}$$

Here, $$W_k = w_k H_k \quad (k = 1, 2, \ldots, M) \tag{13}$$

$$W_s = \sum_{k=1}^{M} w_k H_k$$

$$\alpha_0 = \sum_{k=1}^{M} w_k H_k^2$$

$$\alpha_n = \sum_{k=1}^{M} w_k H_k (H_{n+k} - H_n)$$

$$(n = 1, 2, \ldots, N - 1)$$
$$H_{N'} = H_N(N' > N)$$

As set forth above, the incremental amount of modification a(i) given by Eq. (1) minimizes the weighting sum of the square values of the estimated values of the tracking error up to time i+M.

Moreover, the constants $W_k$, $W_s$, $\alpha_0$ and $\alpha_n$ are computed beforehand by measuring the indicial response of the controlled object shown in FIG. 5 and properly providing the weighting coefficient wj relative to time.

In the control algorithm according to the present invention, the future target value r(i+k) and the past output X(i−l+k) are utilized as is apparent from Eq. (5). These items of data have been stored in the memory 4 of FIG. 1 as the tracking error e(i−l+k) as referred to in Eq. (6) and are replaced with new values on a sampling basis.

When tracking errors are converged within the range of desired values after the sufficient number of trials, a series of control inputs for the past period l is recorded in the memories in order that the recorded data is used as a control input without further modification. FIG. 7 shows a system configuration.

According to the first embodiment of the present application as set forth above, the past tracking error, the present tracking error, the incremental amount of past modification, the past control input and the preset constants are used to obtain the control algorithm for making the output of the controlled object follow up the target value having a fixed period through simple four fundamental arithmetic operations. Digital circuits for general use of microcomputers may be employed to implement the algorithm, so that the resulting control system provides follow-up accuracy by far greater than that of any conventional system.

Figure 8:
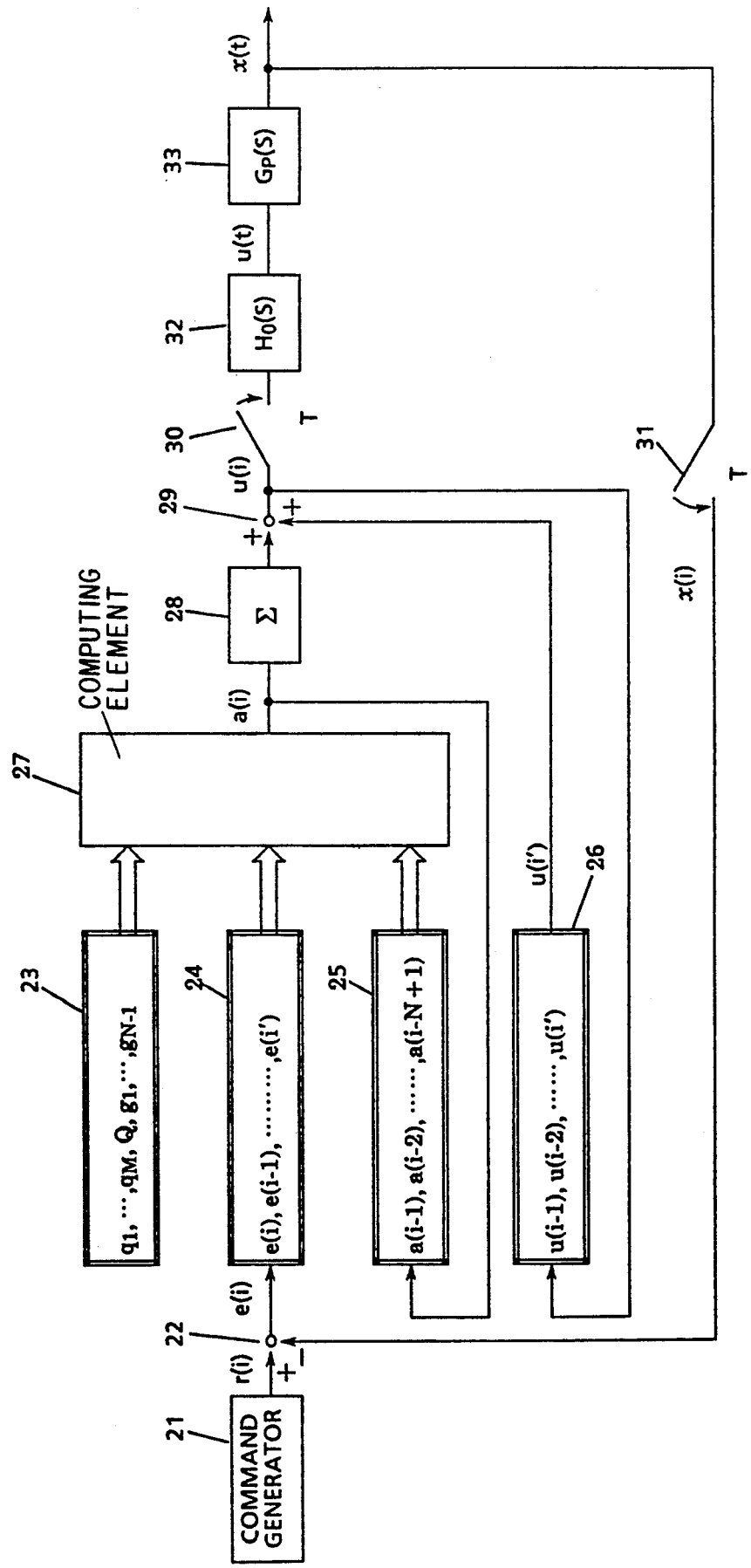
FIG. 8 is a block diagram illustrating a configuration of an embodiment of a second invention of the present application.

FIG. 8 shows a specific embodiment of a second embodiment of the present application. In FIG. 8, a command generator 21 is used to generate a target value r(i) at the present time; a subtractor 22 to obtain a tracking error e(i); a memory 23 to store constants $q_1, q_2, \ldots q_M, Q, g_1, \ldots g_{N-1}$; and a memory 24 to store a tracking error e(j) (j=1, i−1, ..., i'=1, i') at the present time i and during past one period. Here, i'=i−1.

A memory 25 is used to store the incremental amount of modification a(j) (j=i−1, i−2, ..., i−N+1) from the time of one sampling before up to the time of N−1 turns before; a memory 26 to store a control input u(j) (j=i−1, i−2, ..., i'+1, i') from the time of one sampling before up to the time of one period before; and a computing element 27 to compute the incremental amount of modification this time by carrying out the following operations:

$$a(i) = \sum_{k=1}^{M} q_k e(i' + k) + Q\{e(i) - e(i')\} - \sum_{n=1}^{N-1} g_n a(i - n) \quad (21)$$

An accumulator 28 is used to compute the amount of modification $$\sum_{j=i_0}^{i} a(j)$$

this time; an adder 29 to add to a control input u(i') at the time of one period before and the amount of modification $$\sum_{j=i_0}^{i} a(j)$$

this time together and output a control input u(i) this time. At the commencement of control, $u(i_0)=0$, $a(i_0)=0$.

Samplers 30, 31 close with a sampling period of T. Numeral 32 represents a holding circuit.

Numeral 33 represents a controlled object with u(t) as an input and x(t) as an output in the form of an amount controlled.

Numerals 22–32 represent those called controllers in a control system. Digital circuits for general use or microcomputers are simply usable. Moreover, a certain control system (e.g., compensator) may be included in the controlled object 33.

Eq. (21) is proved hereinafter.

Figure 9:
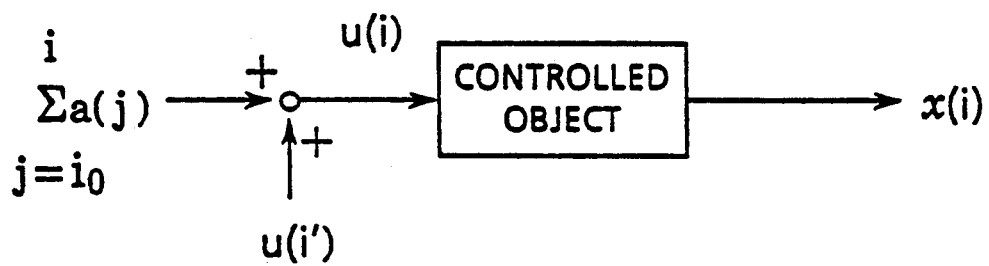
FIGS. 9 to 11 are block diagrams illustrating the input/output relations of a controlled object.
Figure 10:

From FIG. 8, the input/output relation of the controlled object at the present time is as shown in FIG. 9. However, the samplers and the holding circuit are assumed included in the controlled object. Moreover, the relation of FIG. 11 is obtained from FIGS. 9, 10 since the relation of FIG. 10 is established.

Figure 11:
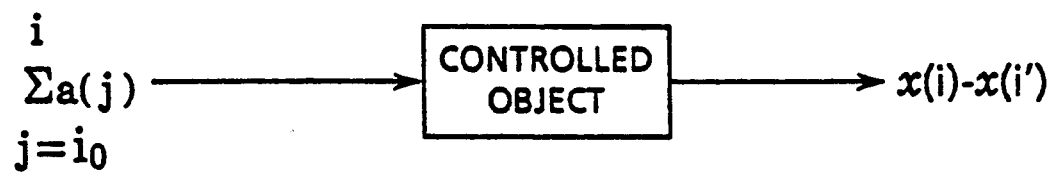

In FIG. 11, an output relative to the amount of modification $$\sum_{j=i_0}^{i} a(j)$$

at the time i is defined as δ(i), i.e., $$\delta(i) \triangleq x(i) - x(i') \quad (22)$$

and, assuming the incremental amount of modification a(j) (j=i+1, i+2, ...) after the time i+1 to be zero, an estimated value $\hat{\delta}(i+k)$ (k=1,2, ...) of the output relative to the amount of modification after the time i+1 is given by the following equation.

$$\hat{\delta}(i + k) = \delta(i) + a(i)H_k + \sum_{n=1}^{N-1} a(i - n)(H_{n+k} - H_n) \quad (23)$$

where Hj (j=1,2, ..., N) is the sample value at the sampling interval T of the indicial response of the controlled object. N is selected in conformity with $H_{N'} = H_N (N' > N)$ as in the case of the first embodiment so that the response is set satisfactory (FIG. 5).

In this case, from Eq. (2), the estimated value $\hat{x}(i+k)$ of the output at the time i+k is given by $$\hat{x}(i+k) = \hat{\delta}(i+k) + x(i'+k) \quad (24)$$

Accordingly, the estimated value ê(i+k) of the tracking error becomes $$\hat{e}(i+k) = r(i+k) - \hat{x}(i+k) = r(i+k) - x(i'+k) - \hat{\delta}(i+k) \quad (25)$$

Since r(i'+k)=r(i+k), moreover, ultimately $$\hat{e}(i+k) = e(i'+k) - \hat{\delta}(i+k) \quad (26)$$

The weighting square sum J of the estimated values of the tracking errors up to the future time i+M is assumed $$J = \sum_{k=1}^{M} w_k \{\hat{e}(i + k)\}^2 \quad (27)$$

as a cost function and the incremental amount of modification at this time a(i) is selected so as to minimize J. In this case, the estimated value ê(i+k) of the tracking error at the future time i+k is multiplied by a weighting coefficient $w_k$ as in the case of the first embodiment of FIG. 6 showing the value thus selected.

In order to minimize J, a(i) is given by $$\partial J/\partial a(i) = 0 \quad (28)$$

Since $$\partial J/\partial a(i) = \partial \left( \sum_{k=1}^{M} w_k \hat{e}^2(i + k) \right) / \partial a(i) \quad (29)$$

$$= \partial \left( \sum_{k=1}^{M} w_k \{e(i' + k) - \hat{\delta}(i + k)\}^2 \right) / \partial a(i)$$

$$= -2 \sum_{k=1}^{M} w_k H_k \left( e(i' + k) - \delta(i) - \right.$$

-continued $$a(i)H_k - \sum_{n=1}^{N-1} a(i-n)(H_{n+k} - H_n) \Bigg\}$$

from Eqs. (27), (26) and (23), $$\left( \sum_{k=1}^{M} w_k H_k^2 \right) a(i) = \qquad (30)$$

$$\sum_{k=1}^{M} w_k H_k \left\{ e(i'+k) - \delta(i) - \sum_{n=1}^{N-1} a(i-n)(H_{n+k} - H_n) \right\}$$

from Eqs. (28), (29).

From Eq. (22), $\delta(i)$ can be rewritten as follows:

$$\delta(i) = x(i) - x(i') = \{r(i') - x(i')\} - \{r(i) - x(i)\} \qquad (31)$$
$$= e(i') - e(i)$$

From Eqs. (30), (31), a(i) minimizing J is given by the following equation.

$$a(i) = \sum_{k=1}^{M} q_k e(i'+k) + Q\{e(i) - e(i')\} - \sum_{n=1}^{N-1} g_n a(i-n) \qquad (32)$$

Here, $$q_k = w_k H_k / \left\{ \sum_{k=1}^{M} w_k H_k^2 \right\} (k = 1, 2, \ldots, M) \qquad (33)$$

$$Q = \sum_{k=1}^{M} q_k$$

$$g_n = \sum_{k=1}^{M} q_k(H_{n+k} - H_n) \ (n = 1, 2, \ldots, N-1)$$

$$H_{N'} = H_N \ (N' > N).$$

The incremental amount of modification a(i) given in Eq. (21) thus minimize the cost function J defined in Eq. (27).

The constants $q_k$, Q and $g_n$ of Eq. (33) are computed beforehand by measuring the indicial response of the controlled object shown in FIG. 5 and properly providing the weighting coefficient $w_k$.

In the control algorithm according to the present invention, the future target value r(i+k) and the past output x(i'+k) are utilized as shown in Eq. (25). These items of data are stored in the memory 24 of FIG. 8 as the past tracking error e(i'+k) in Eq. (26).

Figure 12:
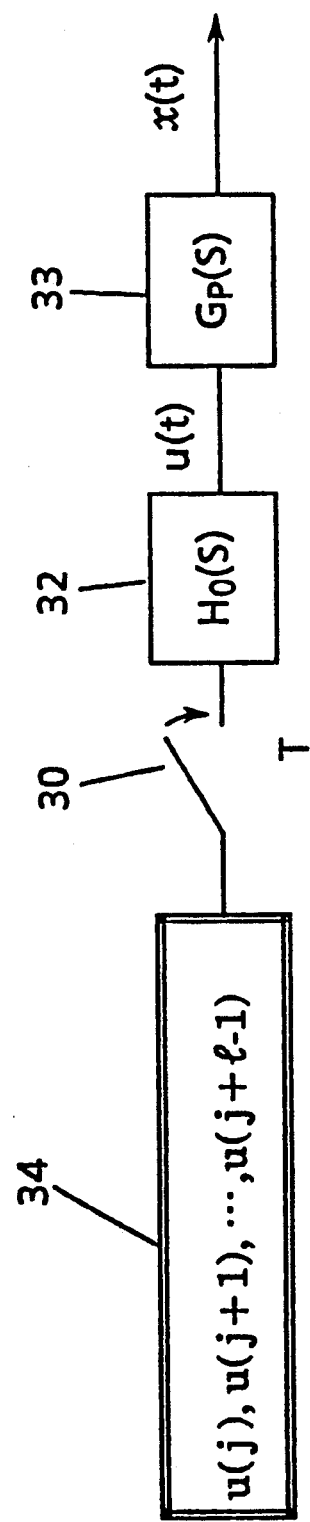
FIG. 12 is a block diagram illustrating an arrangement when data stored in a memory is used as a control input.

After the tracking errors are converged within the range of desired values through sufficient repetition, the control may be performed using a series of control inputs equivalent to the past one period recorded in the memories. FIG. 12 shows a system configuration in that case.

When the trial computation of Eq. (21) becomes appreciably longer as compared with the sampling time T, the incremental amount of modification a(i+1) of one sampling after is computed at the present time i and, when the whole incremental amount of modification a(j) (j=i+2, i+3, ...) is assumed zero, the estimated value $\delta(i+k)$ the future time i+k is given by $$\delta(i+k) = \delta(i) + a(i+1)H_{k-1} +$$

$$\sum_{n=1}^{N} a(i-(n-1))(H_{n-k-1} - H_{n-1})$$

where $H_O = 0$. In the same manner, it is only necessary to obtain a(i+1) minimizing the cost function J of Eq. (27).

According to the second embodiment of the present application, as set forth above, the past tracking error, the present tracking error, the incremental amount of past modification, the past control input and the preset constants are used to obtain the control algorithm for making the output of the controlled object follow up the target value having a fixed period through simple four fundamental arithmetic operations. Digital circuits for general use or microcomputers are subsequently employed to implement the algorithm, so that the resulting control system provides follow-up accuracy by far, greater than that of any conventional system.

Figure 13:
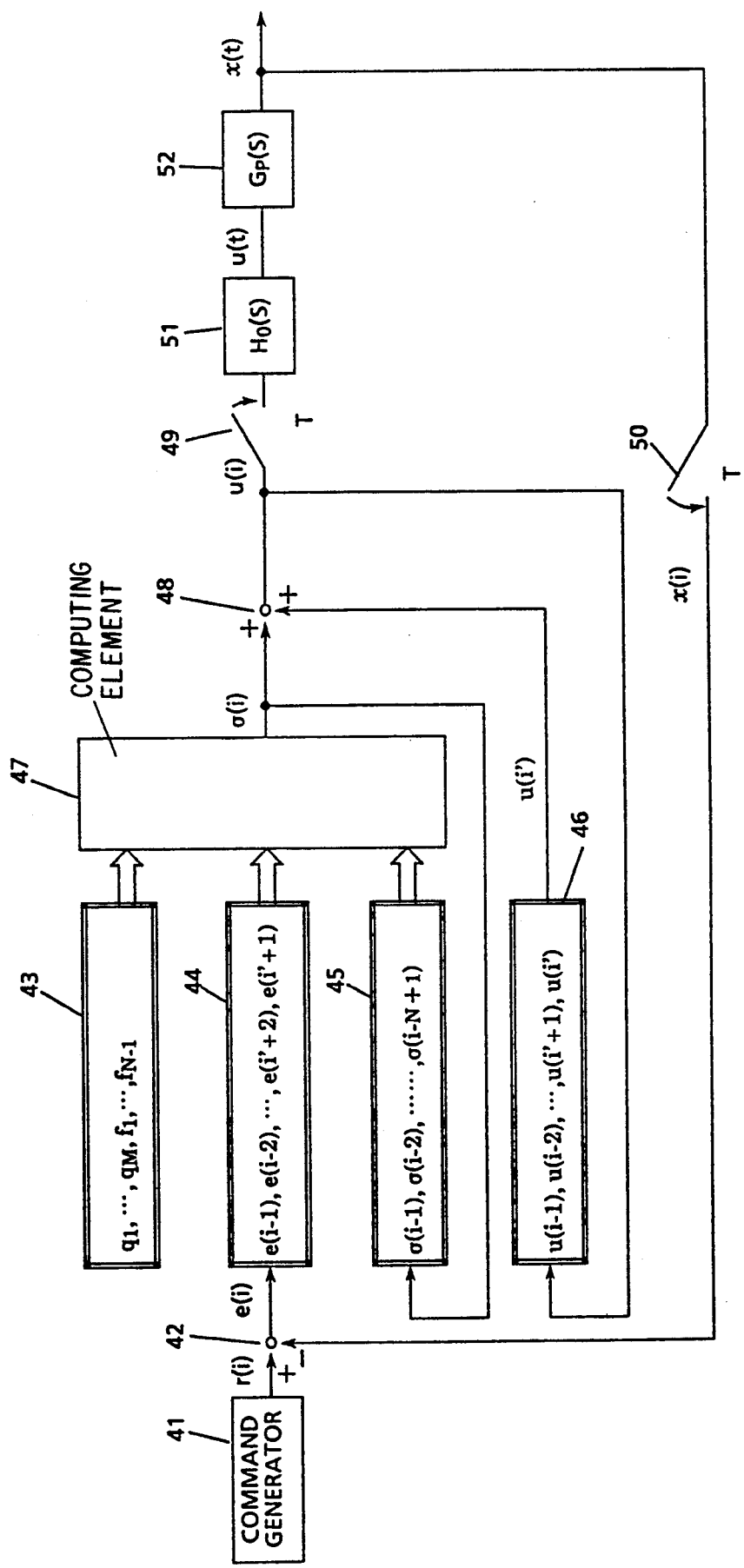
FIG. 13 is a block diagram illustrating a configuration of an embodiment of a third invention of the present application.

FIG. 13 shows a specific embodiment of a third embodiment of the present application. In FIG. 13, a command generator 41 is used to generate the target value r(i) at the present time having a fixed period l, a substractor 42 to obtain a tracking error e(i); a memory 43 to store constants $q_1, q_2, \ldots, q_M, f_1, f_2, \ldots, f_{N-1}$; and a memory 44 to store the a tracking error e(j) (j=i-1, ..., i'+2, i'+1) at the present time i and during past one period. Here, i'=i−1.

A memory 45 is used to store the amount of past modification $\sigma(j)$ (j=i−1, i−2, ..., i−N+1) from one sampling turn before up to N−1 turns before; a memory 46 to store a control input u(j) (j=i−1, i−2, ..., i'+1, i') during the past one period; and a computing element 47 to compute the amount of modification $\sigma(i)$ at the time i by carrying out the following operations:

$$\sigma(i) = \sum_{k=1}^{M} q_k e(i'+k) - \sum_{n=1}^{N-1} f_n \sigma(i-n) \qquad (41)$$

An adder 48 is used to add a control input u(i') at the time of one period before and the amount of modification $\sigma(i)$ this time together and output a control input u(i) this time. The past tracking error, the amount of modification and the control input are given totally as zero at the commencement of control.

Samplers 49, 50 close with a sampling period of T. Numeral 51 represents a holding circuit. Numeral 52 represents a controlled object with u(t) as an input and x(t) as an output. Numerals 42-51 represent those called controllers in a control system. Digital circuits for general use or microcomputers are simply usable. Moreover, a certain control system (e.g., compensator) may be included in the controlled object 52.

Eq. (41) is proved hereinafter.

Figure 14:
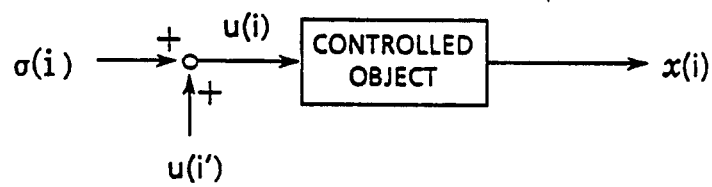
FIGS. 14 to 16 are block diagrams illustrating the input/output relations of a controlled object.
Figure 15:

From FIG. 13, the input/output relation of the controlled object at the present time i is as shown in FIG. 14. Here, the samplers and the holding circuit are assumed included in the controlled object. Moreover, the relation of FIG. 16 is obtained from FIGS. 14, 15 since the relation of FIG. 15 is established at the time i' of one period before.

Figure 16:
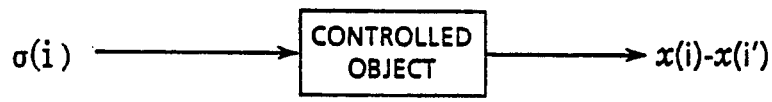

In FIG. 16, an output relative to the amount of modification $\sigma(i)$ at the present time i is defined as $\delta(i)$, i.e., $$\delta(i) \triangleq x(i) - x(i') \qquad (42)$$

and, assuming the amount of correction modification $\sigma(j)$ $(j=i+1, i+2, \ldots)$ after the time $i+1$ to be $\sigma(i)$ in value, an estimated value $\hat{\delta}(i+k)$ $(k=1,2, \ldots)$ of the output relative to the amount of modification after the time $i+1$ is given by the following equation.

$$\delta(i+k) = H_k\sigma(i) + \sum_{n=1}^{N-k}(H_{k+n} - H_{k+n-1})\sigma(i-n) \quad (43)$$

where $H_j$ $(j=1,2,\ldots,N)$ is the sample value at the sampling interval T of the indicial response of the controlled object. N is selected in conformity with $H_{N'} = H_N (N' > N)$ as in the case of the first embodiment so that the response is set satisfactory (FIG. 5).

In this case, from Eq. (42), the estimated value $\hat{x}(i+k)$ of the output at the time $i+k$ is given by $$\hat{x}(i+k) = \delta(i+k) + x(i'+k) \quad (44)$$

Accordingly, the estimated value $\hat{e}(i+k)$ of the tracking error becomes $$e(i+k) = r(i+k) - x(i+k) = r(i+k) - x(i'+k) - \delta(i+k) \quad (45)$$

Since $r(i'+k) = r(i+k)$, moreover, ultimately $$e(i+k) = e(i'+k) - \delta(i+k) \quad (46)$$

The weighting square sum J of the estimated values of the tracking error up to the future time $i+M$ is assumed $$J = \sum_{k=1}^{M} w_k\{\hat{e}(i+k)\}^2 \quad (47)$$

as a cost function and the amount of modification $\sigma(i)$ at the time i is selected so as to minimize J. In this case, the estimated value $\hat{e}(i+k)$ of the tracking error at the future time $i+k$ is multiplied by a weighted coefficient $w_k$ as in the case of the first embodiment of FIG. 6 showing the value thus selected.

In order to minimize J, $\sigma(i)$ is given by $$\partial J/\partial\sigma(i) = 0 \quad (48)$$

Since $$\partial J/\partial\sigma(i) = \partial\left(\sum_{k=1}^{M} w_k\{\hat{e}(i+k)\}^2\right)/\partial\sigma(i) \quad (49)$$

$$= \partial\left(\sum_{k=1}^{M} w_k\{e(i'+k) - \delta(i+k)\}^2\right)/\partial\sigma(i)$$

$$= -2\sum_{k=1}^{M} w_kH_k\Bigg( e(i'+k) - H_k\sigma(i) -$$

$$\sum_{n=1}^{N-k}(H_{k+n} - H_{k+n-1})\sigma(i-n)\Bigg)$$

from Eqs. (47), (46) and (43), $$\left(\sum_{k=1}^{M} w_kH_k^2\right)\sigma(i) = \sum_{k=1}^{M} w_kH_k\Bigg( e(i'+k) - \quad (50)$$

$$\sum_{n=1}^{N-k}(H_{k-n} - H_{k-n-1})\sigma(i-n)\Bigg)$$

from Eqs. (48), (49) and $\sigma(i)$ satisfying Eq. (50) is given by the following equation:

$$\sigma(i) = \sum_{k=1}^{M} q_ke(i'+k) - \sum_{n=1}^{N-1} f_n\sigma(i-n) \quad (51)$$

Here, $$q_k = w_kH_k/\left(\sum_{k=1}^{M} w_kH_k^2\right) (k = 1, 2, \ldots, M) \quad (52)$$

$$f_n = \sum_{k=1}^{M} q_k(H_{n+k} - H_{n+k-1}) (n = 1, 2, \ldots, N-1)$$

$$H_{N'} = H_N (N' > N).$$

The amount of modification $\sigma(i)$ given in Eq. (41) thus minimizes the cost function J defined in Eq. (47).

The constants $q_k$ and $f_n$ of Eq. (33) are computed beforehand by measuring the indicial response of the controlled object shown in FIG. 5 and properly providing the weighting coefficient $w_k$.

In the control algorithm according to the present invention, the future target value $r(i+k)$ and the past output $x(i'+k)$ are utilized as shown in Eq. (45). These items of data are stored in the memory 44 of FIG. 13 as the past tracking error $e(i'+k)$ in Eq. (46).

When the amount of modification $\sigma(i)$ at the time i is computed using Eq. (41), moreover, the amount of modification $\sigma(i)$ can be computed prior to the time i because the data (the output of the controlled object, etc.) at the time i is not utilized. Consequently, no problem of input delay due to calculation time is caused.

Figure 17:
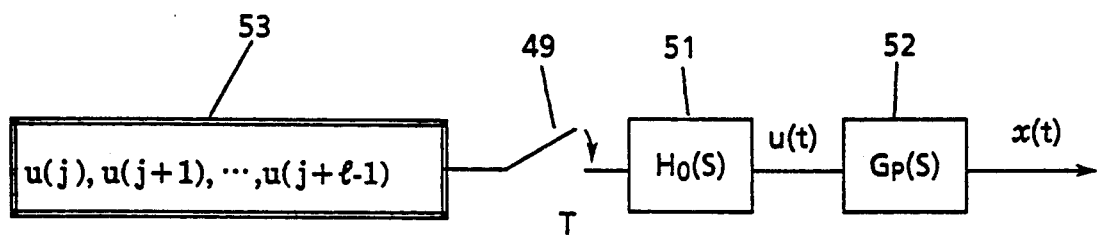
FIG. 17 is a block diagram illustrating an arrangement when data stored in a memory is used as a control input.

After the tracking errors are converged within the range of desired values through sufficient repetition, the control may be performed using a series of control inputs equivalent to the past one period recorded in the memories. FIG. 17 shows a system configuration in that case.

According to the third embodiment of the present application as set forth above, the past tracking error, the amount of past modification, the past control input the preset constants are used to obtain the control algorithm for making the output of the controlled object follow up the target value having a fixed period through simple four fundamental arithmetic operations. Digital circuits for general use or microcomputers are subsequently employed to implement the algorithm, so that the resulting control system provides follow-up accuracy by far, greater than that of any conventional system.

Figure 18A:
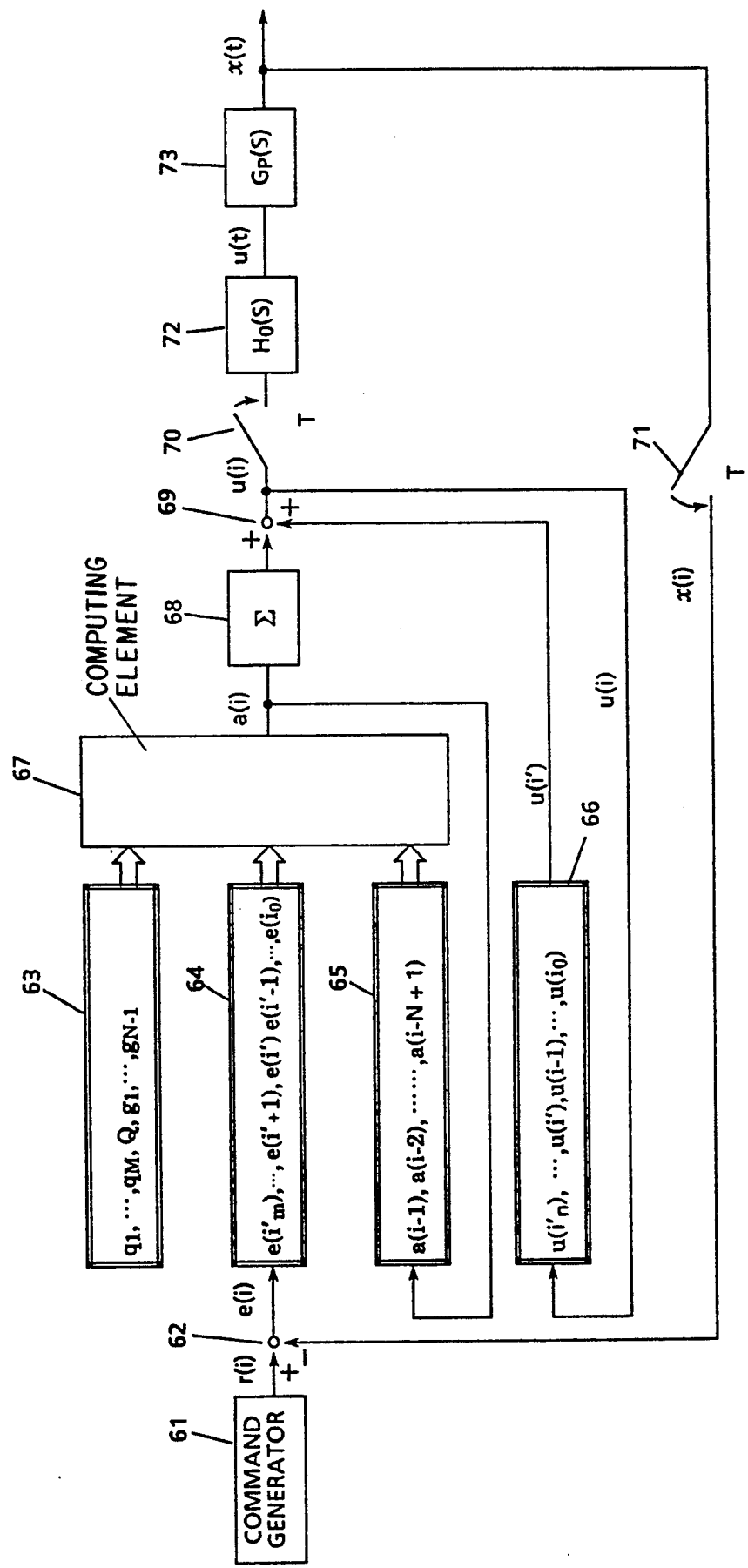
FIG. 18A is a block diagram illustrating a configuration of an embodiment of a fourth invention of the present application.
Figure 18B:
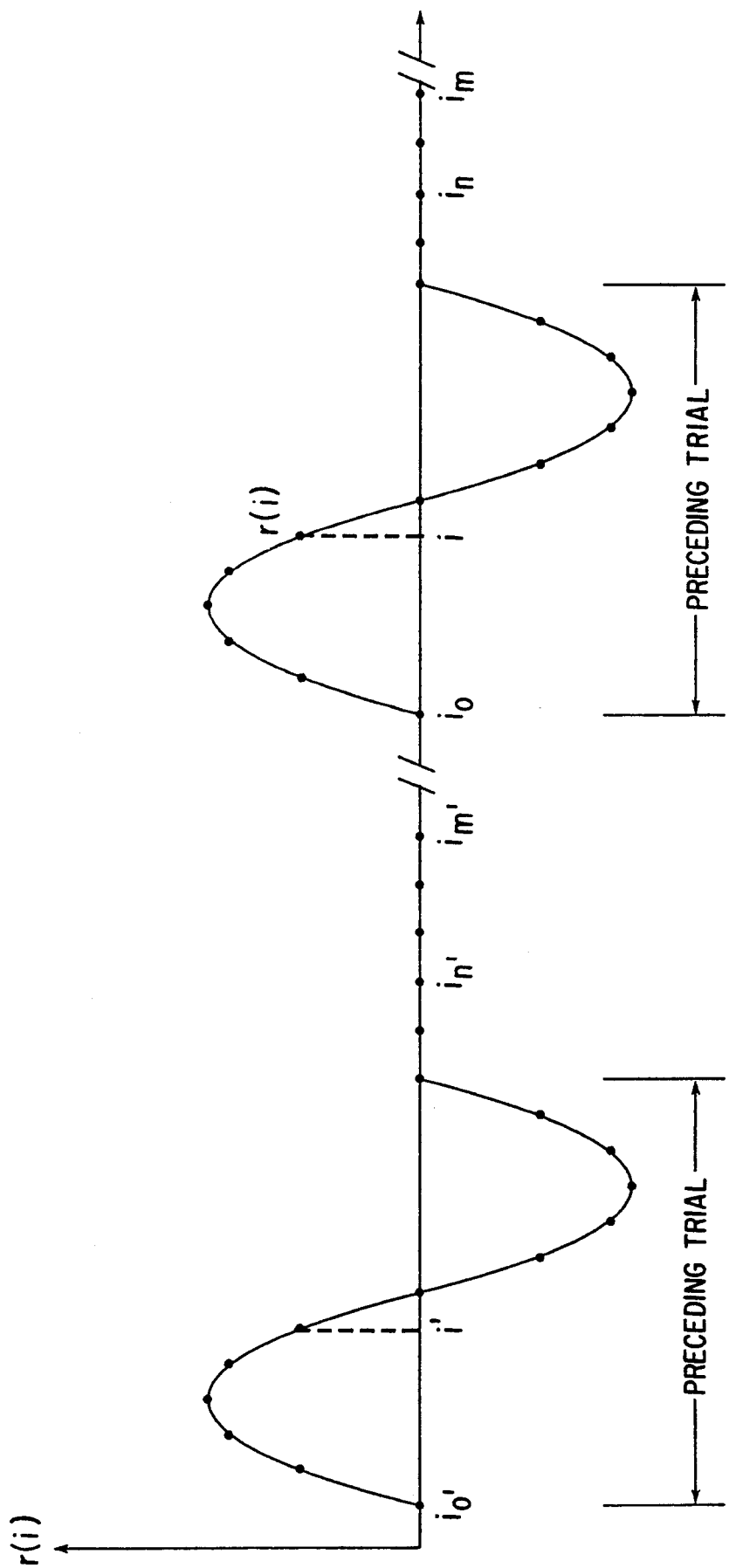
FIG. 18B is a graph illustrating an example of a target value in this embodiment.

FIG. 18A shows an specific embodiment of a fourth embodiment of the present application. In FIG. 18A, a command generator 61 is used to generate a target value $r(i)$ at the present time; and a subtractor 62 to obtain a tracking error $e(i)$. FIG. 18B shows an example of the target value, wherein $i_0(i_0')$, $i_n(i_n')$ are the time when control is commenced and terminated in this (last) trial and further $i_m = i_n + M(i_m' = i_n' + M)$.

A memory 63 is used to store constants $q_1, q_2, \ldots, q_M$, Q, $g_1, g_2, \ldots, g_{N-1}$, and a memory 64 to store a tracking error and replace the error $e(i')$ with $e(i)$ this time after delivering the values of e(i'), e(i'+1), e(i'+2), ... , e(i'+k) to a computing element 67.

A memory 65 is used to store the incremental amount of past modification from one sampling turn before up to N−1 turns before; a memory 66 to store a control input and replace the input u(i') with u(i) this time after delivering the input u(i') at the time of preceding trial; and the computing element 67 compute the incremental amount of modification a(i) at the time i by carrying out the following operations:

$$a(i) = \sum_{k=1}^{M} q_k e(i' + k) + Q\{e(i) - e(i')\} - \sum_{n=1}^{N-1} g_n a(i - n) \quad (61)$$

An accumulator 68 is used to compute the amount of modification $$\sum_{j=i_0}^{i} a(j)$$

at the time i; an adder 68 to add the control input u(i') at the time of preceding trial and the amount of modification $$\sum_{j=i_0}^{i} a(j)$$

and deliver a control input u(i) at the time i.

Samplers 70, 71 close with a sampling period of T. Numeral 72 represents a holding circuit. Numeral 73 represents a controlled object with u(t) as an input and x(t) as an output.

Numeral 62-72 represent those called controllers in a control system. These controllers may be easily produced by using digital circuits for general use or microcomputers. Moreover, a certain control system (e.g., compensator) may be included in the controlled object 52.

Eq. (61) is proved hereinafter.

Figure 19:
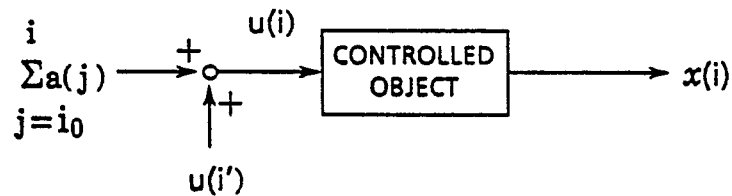
FIGS. 19 to 21 are block diagrams illustrating the input/output relations of a controlled object.
Figure 20:

From FIG. 18A, the input/output relation of the controlled object at the present time i is as shown in FIG. 19. Here, the samplers and the holding circuit are assumed included in the controlled object. Moreover, the relation of FIG. 21 is obtained from FIGS. 19, 20 since the relation of FIG. 20 is established at the time i' of the preceding trial corresponding to the present time i.

Figure 21:

In FIG. 21, an output relative to the amount of modification $$\sum_{j=i_0}^{i} a(j)$$

at the present time i is defined as δ(i), i.e., $$\delta(i) \triangleq x(i) - x(i') \quad (62)$$

and, assuming the incremental amount of modification a(j) (j=i+1, i+2, ...) after the time i+1 to be totally zero, an estimated value δ̂(i+k) (k=1,2, ...) of the output relative to the amount of modification after the time i+1 is given by the following equation.

$$\hat{\delta}(i + k) = \delta(i) + H_k a(i) + \sum_{n=1}^{N-1} (H_{n-k} - H_n) a(i - n) \quad (63)$$

where $H_j$ (j=1,2, ...,N) is the sample value at the sampling interval T of the indicial response of the controlled object. N is selected in conformity with $H_{N'} = H_N$ (N'>N) as in the case of the first embodiment so that the response is set satisfactory (FIG. 5).

In this case, from Eq. (62), the estimated value x̂(i+k) of the output at the time i+k is given by $$\hat{x}(i+k) = \hat{\delta}(i+k) + x(i'+k) \quad (64)$$

Accordingly, the estimated value ê(i+k) of the tracking error becomes $$\hat{e}(i+k) = r(i+k) - \hat{x}(i+k) = r(i+k) - x(i'+k) - \hat{\delta}(i+k) \quad (65)$$

Since r(i'+k)=r(i+k), moreover, ultimately $$\hat{e}(i+k) = e(i'+k) - \hat{\delta}(i+k) \quad (66)$$

The weighting square sum J of the estimated values of the tracking error up to the future time i+M is assumed $$J = \sum_{k=1}^{M} w_k \{\hat{e}(i + k)\}^2 \quad (67)$$

as a cost function and the incremental amount of modification a(i) at the present time i is selected so as to minimize J. In this case, the estimated value ê(i+k) of the tracking error at the future time i+k is multiplied by a weighting coefficient $w_k$ as in the case of the first embodiment of FIG. 6 showing the value thus selected.

In order to minimize J, a(i) is given by $$\partial J/\partial a(i) = 0 \quad (68)$$

Since $$\partial J/\partial a(i) = -2 \sum_{k=1}^{M} w_k H_k \left( e(i' + k) - \delta(i) - H_k a(i) - \sum_{n=1}^{N-1} (H_{n+k} - H_n) a(i - n) \right) \quad (69)$$

from Eqs. (67), (66) and (63), $$\left( \sum_{k=1}^{M} w_k H_k^2 \right) a(i) = \sum_{k=1}^{M} w_k H_k \left( e(i' + k) - \delta(i) - \sum_{n=1}^{N-1} (H_{n+k} - H_n) a(i - n) \right) \quad (70)$$

from Eqs. (68), (69), Moreover, δ(i) can be rewritten from Eq. (62) as follows:

$$\begin{aligned} \delta(i) &= x(i) - x(i') = \{r(i') - x(i')\} - \{r(i) - x(i)\} \\ &= e(i') - e(i) \end{aligned} \quad (71)$$

From Eqs. (70), (71), a(i) minimizing J is given by the following equation:

$$a(i) = \sum_{k=1}^{M} q_k e(i' + k) + Q\{e(i) - e(i')\} - \sum_{n=1}^{n-1} g_n a(i - n) \quad (72)$$

Here, $$q_k = w_k H_k / \left( \sum_{k=1}^{M} w_k H_k^2 \right) \quad (k = 1, 2, \ldots, M) \quad (73)$$

$$Q = \sum_{k=1}^{M} q_k$$

$$g_n = \sum_{k=1}^{M} q_k H_k (H_{n+k} - H_n) \quad (n = 1, 2, \ldots, N - 1)$$

$$H_{N'} = H_N (N' > N).$$

The incremental amount of modification a(i) given in Eq. (61) thus minimizes the cost function J defined in Eq. (67).

The constants $q_k$, Q and $g_n$ of Eq. (73) are computed beforehand by measuring the indicial response of the controlled object shown in FIG. 5 and properly providing the weighting coefficient $w_k$ as shown in FIG. 6.

In the control algorithm according to the present invention, the future target value r(i+k) and the output x(i'+k) at the preceding trial are utilized as is obvious from Eq. (65). These items of data are stored in the memory 64 of FIG. 18A as the tracking error e(i'+k) at the preceding trial in Eq. (66).

Figure 22:
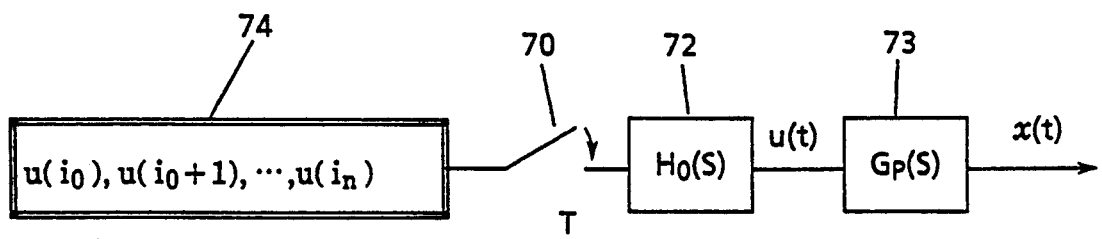
FIG. 22 is a block diagram illustrating an arrangement when data stored in a memory is used as a control input.

After the tracking errors are converged within the range of desired values through sufficient repetition, the control may be performed using a series of control inputs equivalent to the past one period recorded in the memories. FIG. 22 shows a system configuration in that case.

When the computation of Eq. (61) becomes appreciably longer as compared with the sampling time T, the incremental amount of modification a(i+1) of one sampling after is computed at the present time i and, when the whole incremental amount of modification a(j) (j=i+2, i+3, ...) is assumed zero, the estimated value $\hat{\delta}(i+k)$ at the future time i+k is given by $$\hat{\delta}(i + k) = \delta(i) + a(i + 1)H_k - 1 +$$

$$\sum_{n=1}^{N} a(i - n + 1)(H_{n+k-1} - H_{n-1})$$

where $H_0 = 0$. In the same manner, it is only necessary to obtain a(i+1) minimizing the cost function J of Eq. (67).

According to the fourth embodiment of the present application as set forth above, the tracking error and the control input at the preceding trial, the present tracking error, the incremental amount of past modification, and the preset constants are used to obtain the control algorithm for making the output of the controlled object most properly follow up the target repeating the same pattern through simple four fundamental arithmetic operations. Digital circuits for general use or microcomputers are subsequently employed to implement the algorithm, so that the resulting control system provides follow-up accuracy by far greater than that of any conventional system.

FIG. 23 shows a specific embodiment of a fifth embodiment of the present application. In FIG. 23, a command generator 81 is used to generate a command producing the same pattern intermittently and a series of target values $\{r(i)\}$ (j=$i_0, i_0+1, \ldots, i_m$) equivalent to a trial, the series of target values is similar to that of the preceding embodiment of FIG. 18B. In FIG. 23, $i_0(i_0')$, $i_n(i_n')$ are the time when control is commenced and terminated in this (last) trial and further $i_m = i_n + M$ ($i_m' = i_n' + M$). A subtractor 82 is used to obtain a series of tracking errors $\{e(j)\}$(j=$i_0, i_0+1, \ldots, i_m$).

A memory 83 is used to store constants $q_1, q_2, \ldots, q_m, f_1, f_2 \ldots, f_{N-1}$; and a memory 84 to store the amount of modification $\sigma(j)$ (j=$i_0, i_0+1, \ldots, i_n$) at the time of trial this time. The memory 84 needs not always to store the amount of modification equivalent to the whole of one trial.

A memory 85 is used to store a tracking error e(j) (j=$i_0', i_0'+1, \ldots, i_m'$) at the preceding trial and the output value of the subtractor 82, i.e., tracking error e(j) (j=$i_0, i_0+1, \ldots, i_m$) at a trial this time.

A computing element 86 is used to compute a control input u(j) (j=$i_0, i_0+1, \ldots i_n$) at the trial this time by carrying out the following operations:

$$u(i) = u(i') + \sigma(i) \quad (i = i_0, i_0 + 1, \ldots, i_n) \quad (81a)$$

$$\sigma(i) = \sum_{k=1}^{M} q_k e(i' + k) - \sum_{n=1}^{N-1} f_n \sigma(i - n) \quad (81b)$$

In this case, i' represents the preceding time corresponding to the time i at the trial this time (see FIG. 18B) and further $\sigma(j) = 0$ (j≦$i_0$).

A memory 87 is used to store a control input equivalent to a trial and stored with the input u(j) (j=$i_0'$, $i_0'+1, \ldots i_n'$) at the preceding trial. Then the memory 87 stores the input u(j) (j=$i_0, i_0+1, \ldots i_n$) computed by the computing element 86 when the preceding trial is terminated and output the resulting produce at the trial this time.

Samplers 88, 89 close with a sampling period of T. Numeral 90 represents a holding circuit. Numeral 91 represents a controlled object with u(t) as an input and x(t) as an output. A control output u(j) (j=$i_n+1, i_n+2, \ldots, i_m$) from the time $i_n$ up to $i_m$ should be set at zero.

Numerals 83-90 represent those called controllers in a control system. Digital circuits for general use or microcomputers are simply usable. Moreover, certain control systems (e.g., a compensator, an inner loop and the like) may be included in the controlled object 91.

Eq. (81) is proved hereinafter.

Figure 28:
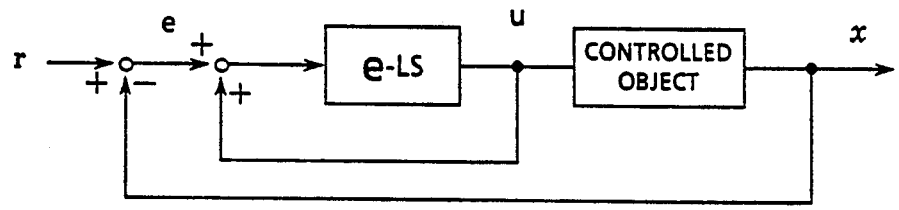
FIG. 28 is a block diagram illustrating a repetitive control system configuration.
Figure 29A:
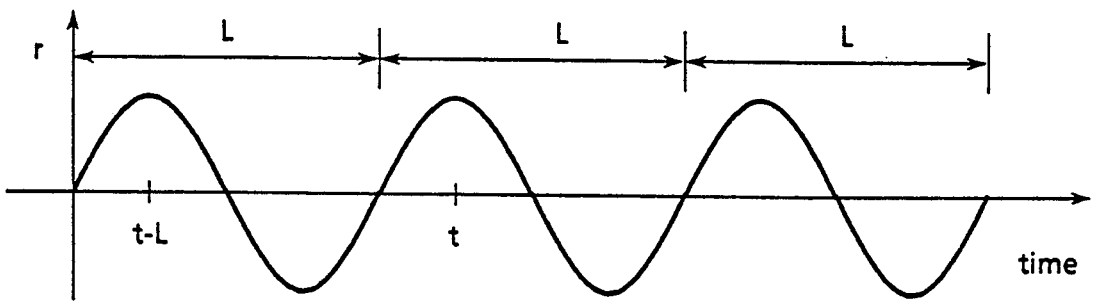
FIG. 29(a) is a graph illustrating an example of a repetitive target value where the target value repeats in a continuous pattern.
Figure 29B:
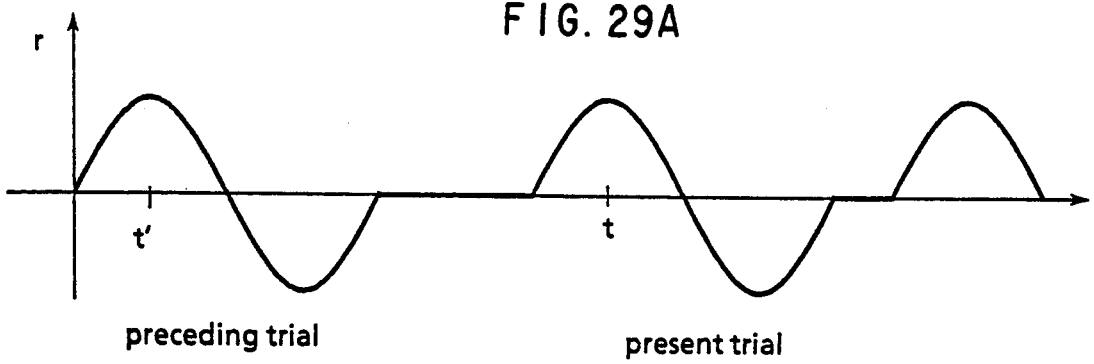

From FIG. 23 and Eq. (81a), the input/output relation of the controlled object at the present time i is as shown in FIG. 24. However, the samplers and the holding circuit are assumed included in the controlled object. Moreover, the relation of FIG. 28 is obtained from FIGS. 24, 25 since the relation of FIG. 25 is established at the time i' of the preceding trial.

In FIG. 26, an output relative to the amount of modification $\sigma(i)$ at the time i is defined as $\delta(i)$, i.e., $$\delta(i) \underline{\Delta} x(i) - x(i') \quad (82)$$

and, assuming the amount of modification $\sigma(j)$ (j=i+1, i+2, ...) after the time i+1 to be totally $\sigma(i)$, an estimated value $\hat{\delta}(i+k)$ (k=1,2, ...) of the output i+1 relative to the amount of modification after the time i+1 is given by the following equation.

$$\hat{\delta}(i+k) = H_k\sigma(i) + \sum_{n=1}^{n-k}(H_{k+n} - H_{k-n-1})\sigma(i-n) \qquad (83)$$

where $H_j$ (j=1,2, ... ,N) is the sample value at the sampling interval T of the indicial response of the controlled object. N is selected in conformity with $H_{N'}=H_N(N'\leq N)$ as in the case of the first embodiment so that the response is set satisfactory (FIG. 5).

In this case, from Eq. (82), the estimated value x(i+k) of the output at the time i+k is given by $$\hat{x}(i+k) = \hat{\delta}(i+k) + x(i'+k) \qquad (84)$$

Accordingly, the estimated value ê(i+k) of the tracking error becomes $$\hat{e}(i+k) = r(i+k) - \hat{x}(i+k) = r(i+k) - x(i'+k) - \hat{\delta}(i+k) \qquad (85)$$

Since $r(i'+k) = r(i+k)$, moreover, ultimately
$$\hat{e}(i+k) = e(i'+k) - \hat{\delta}(i+k) \qquad (86)$$

The weighting square sum J of the estimated values of the tracking errors up to the future time i+M is assumed $$J = \sum_{k=1}^{M} w_k\{\hat{e}(i+k)\}^2 \qquad (87)$$

as a cost function and the amount of modification $\sigma(i)$ at the time i is selected so as to minimize J. In this case, the estimated value ê(i+k) of the tracking error at the time i+k is multiplied by a weighting coefficient $w_k$ as in the case of the first embodiment of FIG. 6 showing the value thus selected.

In order to minimize J, $\sigma(i)$ is given by $$\partial J/\partial \sigma(i) = 0 \qquad (88)$$

Since $$\partial J/\partial \sigma(i) = \partial\left\{\sum_{k=1}^{M} w_k\{\hat{e}(i+k)\}^2\right\}/\partial \sigma(i)$$

$$= \partial\left\{\sum_{k=1}^{M} w_k\{e(i'+k) - \delta(i+k)\}^2\right\}/\partial \sigma(i) \qquad (89)$$

$$= -2\sum_{k=1}^{M} w_k H_k\left\{e(i'+k) - H_k\sigma(i) - \sum_{n=1}^{N-k}(H_{k+n} - H_{k+n-1})\sigma(i-n)\right\}$$

from Eqs. (87), (86) and (83), $$\left(\sum_{k=1}^{M} w_k H_k^2\right)\sigma(i) = \qquad (90)$$

$$\sum_{k=1}^{M} w_k H_k\left\{e(i'+k) - \sum_{n=1}^{N-k}(H_{k+n} - H_{k+n-1})\sigma(i-n)\right\}$$

from Eqs. (88), (89). Moreover, $\sigma(i)$ which satisfied Eq. (90) is given by the following equation:

$$\sigma(i) = \sum_{k=1}^{M} q_k e(i'+k) - \sum_{n=1}^{N-1} f_n \sigma(i-n) \qquad (91)$$

Here, $$q_k = w_k H_k / \left\{\sum_{k=1}^{M} w_k H_k^2\right\} \quad (k = 1, 2, \ldots, M) \qquad (92)$$

$$f_n = \sum_{k=1}^{M} q_k(H_{n+k} - H_{n+k-1}) \quad (n = 1, 2, \ldots, N-1)$$

$$H_{N'} = H_N (N' > N).$$

The amount of modification $\sigma(i)$ given in Eq. (81) thus minimizes the cost function J defined in Eq. (87).

The constants $q_k$ and $f_n$ of Eq. (93) are computed beforehand by measuring the indicial response of the controlled object shown in FIG. 5 and properly providing the weighting coefficient $w_k$ as shown in FIG. 5.

In the control algorithm according to the present invention, the input u(j) (j=i₀,i₀+1, ... i_n) at the trial this time is computed by the computing element 86 after the preceding trial is terminated and then the trial this time can be effected. This is because the value of one trial before is effectively utilized without feeding back the output of the controlled object in real time. Consequently, no calculation of the control input in real time is required.

After the tracking errors are converged within the range of desired values through sufficient trial repetition, the control may be performed using a series of control inputs equivalent to the past one period recorded in the memories. FIG. 27 shows a system configuration then.

According to the fifth embodiment of the present application as set forth above, the tracking error and the control input at the preceding trial and the preset constants are used to obtain the control algorithm for making the output of the controlled object most properly follow up the target repeating the same pattern through simple four fundamental arithmetic operations. Digital circuits for general use or microcomputers are subsequently employed to implement the algorithm, so that the resulting control system provides follow-up accuracy by far greater than that of any conventional system. Moreover, the above-described calculations may be carried out during the intervals between the trials and, since no calculation is required at the time of trial, it becomes possible to exercise control with a sampling period shorter than before. This also contributes to improvement in follow-up accuracy.

INDUSTRIAL FEASIBILITY

The present invention is applicable to the implementation of repetitive control over the operation of making an object being controlled follow a periodic target as in the case of controlling the position of a teaching playback type robot, a machine tool and the like.

We claim:

1. A control method for tracking to a target that repeats the same pattern with a predetermined period, for producing a control input signal U(i) at sampling times i in successive periods 1, for controlling a controlled object, in a control system, said control system having a generator for producing a target value signal and the controlled object producing a control output, said method comprising repetitively combining said target value signal and control output signal to produce sampled tracking error signals e(i) and storing said tracking error signals e(i), repetitively generating and storing signals a(i) corresponding to the incremental modification of the control input signal U(i) at the sampling times i in accordance with the relationship:

$$\left[ U(i) = U(i-1) + \sum_{j=-\infty}^{i} (i) \right]$$

$$a(i) = \left\{ \sum_{k=1}^{M} Wk \, e(i+k-1) - Ws(e(i-1) - e(i)) - \sum_{n=1}^{N-1} a_n \, a(i-n) \right\} / a0$$

where

N: the number of samples for the indicial response of the controlled object to settle satisfactorily;

M: the number of samples in consideration of a weighting coefficient relative to time; and Wk: (k=1, ..., M), $a_n$ (n=0, ..., N−1) and Ws: constants determined by the indicial response of the controlled object and the weighting coefficient relative to time, and repetitively generating and storing said control input signals U(i) in accordance with the relationship:

$$U(i) = U(i-1) + \sum_{j=-\infty}^{i} a(j)$$

using said stored signals a(i) in the former relationship, and applying said control input signals U(i) to said controlled object.

2. A control method as claimed in claim 1, comprising recording control inputs U(j) (j=1, ... i+1−1) for one period in memories after tracking errors resulting from the sufficient number of trials have converged at a value smaller than the one desired in order that data thus recorded is used as a control input without being calculated.

3. A control method for optimum tracking to the target value that repeats the same pattern with a predetermined period, for producing a control input signal u(i) at sampling times i in successive periods 1, for controlling a controlled object, in a control system, said control system having a generator for producing a target value signal and the controlled object producing a control output, said method comprising repetitively combining said target value signal and control output to produce sampled tracking error signals e(i) and storing said tracking error signals e(i), repetitively generating and storing said control input signal u(i) in accordance with the relationship:

$$u(i) = u(i') + \sum_{j=i_0}^{i} a(j)$$

where i′: sampling time of a period before the present time;

a(j): an incremental value signal corresponding to the modification at sampling time j; and i0: time when the initial value of the incremental amount of modification is set, generating and storing the incremental signal a(i) at the present time by using data pertaining to the dynamic characteristics of the controlled object, tracking errors during the present and past one periods, and past incremental amounts of modification and applying said control input signals u(i) to said controlled object.

4. A control method for optimum tracking to a periodic target value as claimed in claim 3, comprising determining the incremental amount of modification a(i) at the present time so that the weighted square sum $$J = \sum_{k=1}^{M} w_k \{e(i+k)\}^2$$

($w_k$: weighted coefficient)

of the estimated values ê(j) (j=i+1, i+2, ..., i+M) of future tracking errors from the time i+1 up to the future time i+M is minimized.

5. A control method for optimum tracking to a periodic target value as claimed in claim 3, comprising utilizing a sampling value of the indicial response of a controlled object as data pertaining to the dynamic characteristics of the controlled object.

6. A control method for optimum tracking to a periodic target value as claimed in claim 3, comprising determining the incremental amount of modification a(i) at the present time by the relationship:

$$a(i) = \sum_{k=1}^{M} q_k e(i' + k) + Q\{e(i) - e(i')\} - \sum_{n=1}^{N-1} g_n a(i-n)$$

where e(i): a tracking error at time i;

N: the number of samplings of the indicial response of the control system;

M: the estimated number of tracking errors; and qk (k=1, ..., M), Q and $g_n$ (n=1, ... N−1): constants determined by the sample value of the indicial response of the control system and the weights applied to the estimated value of the tracking errors.

7. A control method for optimum tracking to a periodic target value as claimed in claim 3, using a control input for one period stored in the memory for the operation thereof after tracking errors resulting from the sufficient number of trials have converged at a value smaller than the one desired.

8. A control method for optimum tracking to a periodic target value as claimed in claim 3, comprising determining an incremental amount of modification a(i+1), in place of a(i), at the present time i in consideration of delay in calculation time and wherein the value thus determined is utilized at time i+1.

9. A control method for tracking to the target value that repeats the same pattern with a predetermined period, for producing a control input signal u(i) at sampling times i in successive periods 1, for controlling a controlled object, in a control system, said control system having a generator for producing a target value signal and the controlled object producing a control output, said method comprising repetitively combining said target value signal and control output to produce a sampled tracking error signal e(i) and storing said tracing error signal e(i), wherein the control system has a memory for storing the tracking error signals and control input signals during a past period and the past values of modification signals, generating and storing the control input signal u(i) in said memory, in accordance with the relationship:

$$u(i) = u(i') + \sigma(i)$$

where
i': sampling time one period before the present time,
$\sigma(i)$ is a value of the modification signal at the present time i and determined as a function of data stored in said memory pertaining to the dynamic characteristics of the controlled object, the tracking error during the past period, and the value of the past modification signal, and applying said control input signal u(i) to said controlled object.

10. A sampling control method as claimed in claim 9, comprising determing the amount of modification $\sigma(i)$ so that the weighted square sum of the estimated value ê(j) (j=i+1, i+2,...,i+M) of the future tracking error $$J = \sum_{k=1}^{M} w_k \{\hat{e}(i + k)\}^2$$

($w_k$: weighted coefficient)

from the following time i+1 up to the future time i+M is minimized.

11. A sampling control method as claimed in claim 9, comprising utilizing the sampling value of the indicial response of a controlled object as data pertaining to the dynamic characteristics of the controlled object.

12. A control method for optimum tracking to the periodic target value as claimed in claim 9, comprising determining the amount of modification $\sigma(i)$ at the present sampling time i by the relationship $$\sigma(i) = \sum_{k=1}^{M} q_k e(i' + k) - \sum_{n=1}^{N-1} f_n \sigma(i - n)$$

where
e(i'+k): a tracking error at time i'+k;
N: the number of samplings of the indicial response of the control system;
M: the estimated number of tracking errors;
qk(k=1,..., M) and $f_n$ (n=1,...,N-1): constants determined by the sample value of the indicial response of the control system and the weight applied to the estimated value of the tracking error.

13. A sampling control method as claimed in claim 9, comprising using, after when the tracking errors are converged within the range of desired values through sufficient repetition, a control input for one period stored in the memory for the control without being calculated.

14. A control method for optimum tracking to the target value that intermittently repeats the same pattern, for producing a control input signal u(i) at sampling times i in successive periods 1, for controlling a controlled object, in a control system, said control system having a generator for producing a target value signal and the controlled object producing a control output, said method comprising repetitively combining said target value signal and control output to produce a sampled tracking error signal e(i) and storing said tracking error signal, wherein the control system has a memory for storing control input signals, tracking error signals errors and incremental values of modification signals, generating and storing in said memory a control input signal u(i) at the present time in accordance with the relationship:

$$u(i) = u(i') + \sum_{j=i_0} a(j)$$

where
i': sampling time in the preceding attempt, the time corresponding to the time i;
a(j): the value of an incremental modification signal at sampling time j;
$i_0$; time when the present attempt is started; and
generating and storing the incremental value of the modification signal in said memory at the time i using data stored in said memory pertaining to the dynamic characteristics of a controlled object, the tracking error at the time i, the tracking error in the preceding attempt, and past incremental values of the modification signal determined at the preceding sampling times up to the time i−1, and applying said control input signal u(i) to said controlled object.

15. A sampling control method as claimed in claim 14, comprising using determining the incremental amount of modification a(i) at time i so that the weighted square sum $$J = \sum_{k=1}^{M} w_k \{\hat{e}(i + k)\}^2$$

($w_k$: weighted coefficient)

of the estimated values ê(j) (j=i+1, i+2,...,i+M) of the future tracking errors from the following time i+1 up to the future time i+M is minimized.

16. A control method for optimum tracking to a periodic target value as claimed in claim 14, comprising using a sampling value of the indicial response of a controlled object as data pertaining to the dynamic characteristics of the controlled object.

17. A control method for optimum tracking to a periodic target value as claimed in claim 14, comprising determining the incremental amount of modification a(i) at the present time the relationship by:

$$a(i) = \sum_{k=1}^{M} q_k e(i' + k) + Q\{e(i) - e(i')\} - \sum_{n=1}^{N-1} g_n a(i - n)$$

where
e(i): a tracking error at time i;

N: the number of samplings of the indicial response of the control system;

M: the estimated number of tracking errors; and $q_k(k=1,\ldots,M)$, Q and $g_n$ $(n=1,\ldots N-1)$: constants determined by the sample value of the indicial response of the control system and the weights applied to the estimated value of the tracking error.

18. A control method as claimed in claim 14, comprising using, after the tracking errors have sufficiently converged at a value smaller than the one desired a control input for one period stored in the memory for the control without being calculated.

19. A sampling method as claimed in claim 14, comprising determining the incremental amount of modification $a(i+1)$ but not $a(i)$ at time i in consideration of calculation time delay in order that the value is utilized at time $i+1$.

20. A sampling method as claimed in claim 14, comprising using a memory to store a tracking error at the preceding trial and a value calculated from the preset constants, so that these values are utilized when the control input $u(i)$ is determined.

21. A control method for optimum tracking to the target value that intermittently repeats the same pattern, for producing a control input signal $u(i)$ at sampling times i in successive periods 1, for controlling a controlled object, in a control system, said control system having a generator for producing a target value signal and the controlled object producing a control output, said method comprising repetitively combining said target value signal and control output to produce a sampled tracking error signal $e(i)$ and storing said tracking error signal $e(i)$, wherein the control system has a memory for storing tracking error and control input signals for one attempt, values of modification signals and preset constants, generating and storing a control input signal $u(i)$ in said memory at each sampling time in accordance with the relationship:

$$u(i) = u(i') + \sigma(i)$$

where i': sampling time in the preceding attempt, the time corresponding to the time i;

$\sigma(i)$ is a value of a modification signal at the present time i and generated as a function of data in said memory pertaining to the dynamic characteristics of the controlled object, the value of tracking error signals in the preceding attempt, and the value of the past modification signal before the time i, and applying said control input signal $u(i)$ to said controlled object.

22. A sampling control method as claimed in claim 21, comprising computing a series of control inputs for one trial for a subsequent trial after each trial is terminated, and wherein the results thus computed are stored in memories so that stored data are used at each trial.

23. A sampling control method as claimed in claim 21, comprising determining the amount of modification $\sigma(i)$ at time i so that the weighted square sum $$J = \sum_{k=1}^{M} w_k \{\hat{e}(i+k)\}^2$$

($w_k$: weighted coefficient)

of the estimated values $e(j)$ $(j=i+1, i+2,\ldots,i+M)$ of future tracking errors from the time $i+1$ up to the time $i+M$ is minimized.

24. A control method for optimum tracking to a periodic target value as claimed in claim 21, comprising using a sampling value of the indicial response of a controlled object as data pertaining to the dynamic characteristics of the controlled object.

25. A control method for optimum tracking to a periodic target value as claimed in claim 21, comprising determining the amount of modification $\sigma(i)$ at the present time by the relationship:

$$\sigma(i) = \sum_{k=1}^{M} q_k e(i'+k) - \sum_{n=1}^{N-1} f_n \sigma(i-n)$$

where $e(i'+k)$: a tracking error at time $i'+k$;

N: the number of sampling of the indicial response of the control system;

M: the estimated number of tracking errors; and $q_k$ $(k=1,\ldots,M)$ and $g_n$ $(n=1,\ldots N-1)$: constants determined by the sample value of the indicial response of the control system and the weights applied to the estimated value of the tracking errors.

26. A sampling control method as claimed in claim 21, comprising using, after the tracking errors have sufficiently converged at a value smaller than the one desired through sufficiently many repetitions, a control input for one period stored in the memory for the control without being modified on a trial basis.

* * * * *